UNITED STATES PATENT OFFICE.

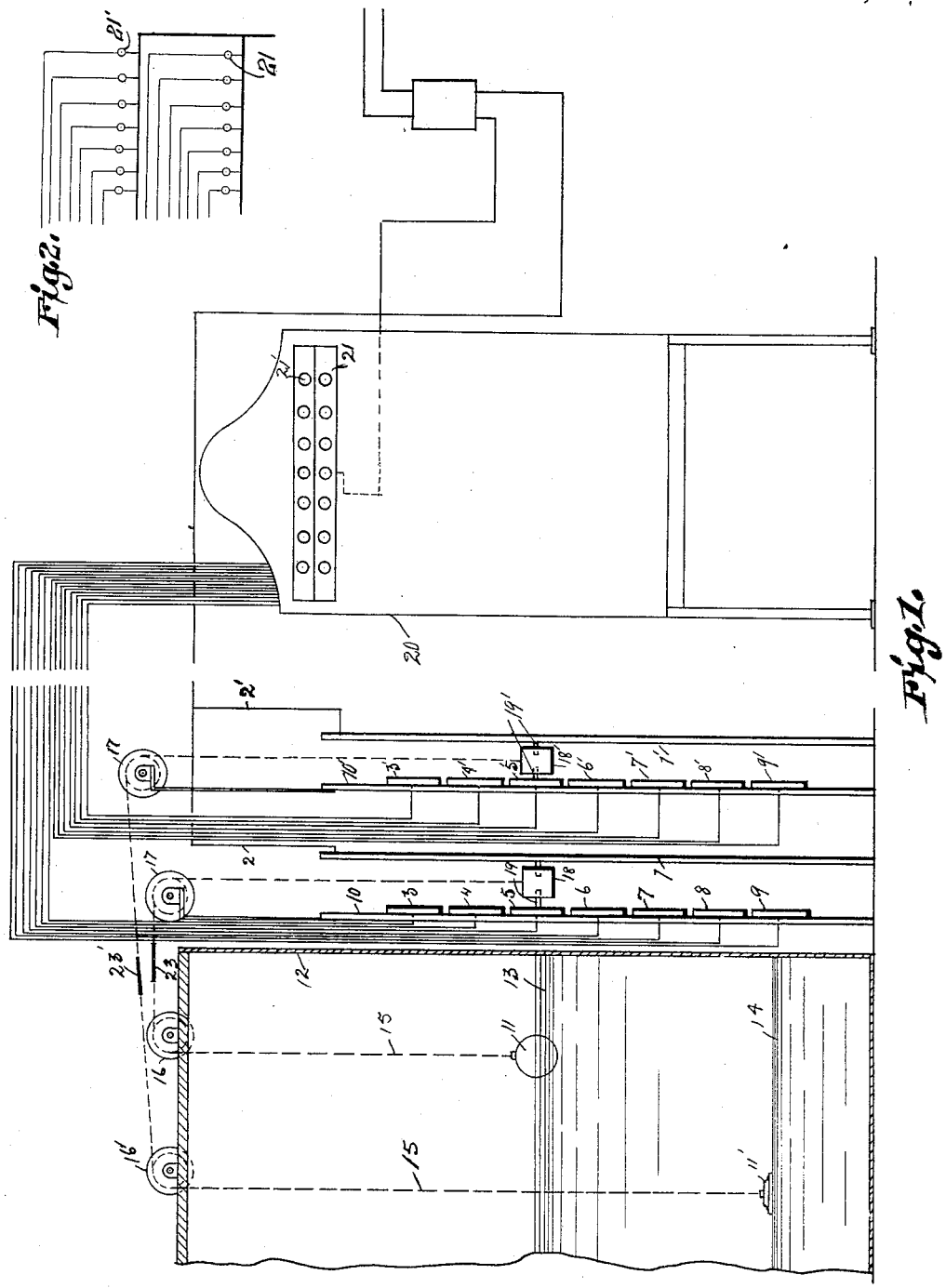

ERNEST C. BARTLETT AND JOSEPH E. ALLISON, OF HOUSTON, TEXAS.

ELECTRICAL TANK-GAGE.

1,396,155.  Specification of Letters Patent.  Patented Nov. 8, 1921.

Application filed September 8, 1917. Serial No. 190,342.

*To all whom it may concern:*

Be it known that we, ERNEST C. BARTLETT and JOSEPH E. ALLISON, citizens of the United States, residing at Houston, in the county of Harris and State of Texas, have invented certain new and useful Improvements in Electrical Tank-Gages, of which the following is a specification.

This invention relates to new and useful improvements in an electrical tank gage.

The object of the invention is to provide a device of the character described whereby the amount of fluid in a tank will be shown by an electric indicator.

A further feature of the invention resides in the provision of a device of the character described which is particularly adapted for use in connection with tanks containing crude oil and which will indicate the entire amount of fluid in the tank as well as the amount of waste matter which has settled in the bottom of the tank.

With the above and other objects in view, the invention has particular relation to certain novel features of construction, arrangement of parts and use, an example of which is given in this specification and illustrated in the accompanying drawings, wherein:—

Figure 1 is an elevational view of the complete device, and

Fig. 2 is a fragmentary view of the wiring employed.

Referring now more particularly to the drawings wherein like numerals of reference designate similar parts in all figures, the numeral 12 indicates a tank partially filled with fluid the upper strata of which is oil 13 and the lower strata of which is composed of the settlings 14 of the oil, consisting principally of salt water, sand and other foreign matter, but being of a fluid consistency. Outside of the tank are mounted two metallic plates 1, 1', connected to which are the electrical conductors 2, 2' respectively, through which electric currents are conducted to said plates. Opposite these plates are the contact points 3 to 9 inclusive and 3' to 9' inclusive, respectively, said contact points being fixed upon and insulated from the respective fixed supports 10 and 10'. Within the tank are the floats 11, 11', the former of which is of slightly less specific gravity than the oil and the latter of which is of slightly less specific gravity than the settlings, so that they will move up and down with said respective fluids. Attached to these floats are the respective cables 15, 15' which pass over suitable pulleys 16, 16' and 17, 17' arranged above the tank and whose outer ends support the respective weights 18, 18'. These weights have the tongues 19, 19' arranged on opposite sides, one of said tongues of each weight being in constant contact with the corresponding plate 1 or 1' as the case may be and the other contact point contacting successively with the opposing points carried by the corresponding supports 10 or 10'. The contact points 3 to 9 and 3' to 9' are connected to electrical conductors which extend to the gage board 20 and are connected to the series of electric lights 21, 21' respectively. It is obvious that as the amount of oil is increased or decreased in the tank, the float 11 will be elevated or lowered and the weight 18 moved downwardly or upwardly contacting with the respective contact points carried by the support 10 and completing a circuit through the corresponding light 21 indicating the amount of oil in the tank and in a similar manner the movements of the float 11' will be indicated, thus indicating the amount of settlings in the bottom of the tank.

The cables 15, 15' are provided with sections 23, 23' formed of insulating material so as to insulate the tank and protect it from the communication of the electric current thereto.

What we claim is:

A device of the type described, including a liquid containing receptacle, floats of somewhat less specific gravity than the contained liquid and somewhat less specific gravity than the liquid settlings, respectively, fixed contact-plates, electrical conductors connected to said contact-plates, series of contact points fixed relative to each other and spaced apart, a current conductor connected to each of said points, an electrical indicator in circuit with each of said last referred to conductors, and a plurality of circuit makers and breakers controlled by said floats, in constant contact with the contact-plates and contacting successively with said contact-points as said floats are affected by the rising and falling of said liquid and the liquid-settlings.

In testimony whereof we have signed our names to this specification in the presece of two subscribing witnesses.

ERNEST C. BARTLETT.
JOSEPH E. ALLISON.

Witnesses:
E. V. HARDWAY,
FLORENCE JOHNSTON.